United States Patent [19]

Bridger et al.

[11] Patent Number: 4,548,695
[45] Date of Patent: Oct. 22, 1985

[54] ELECTRODE FOR USE IN ELECTROCHEMICAL DEIONIZATION AND METHOD OF MAKING SAME

[75] Inventors: Nevill J. Bridger, Hermitage; Andrew D. Turner, Abingdon, both of England

[73] Assignee: United Kingdom Atomic Energy Authority, London, England

[21] Appl. No.: 675,327

[22] Filed: Nov. 27, 1984

[30] Foreign Application Priority Data

Dec. 1, 1983 [GB] United Kingdom ............... 8332089

[51] Int. Cl.[4] ............................................. C25B 11/03
[52] U.S. Cl. .................................. 204/284; 204/294; 264/257
[58] Field of Search ................ 204/284, 294; 264/257

[56] References Cited

U.S. PATENT DOCUMENTS

| | | | |
|---|---|---|---|
| 3,533,929 | 10/1970 | Evans | 204/294 |
| 3,658,685 | 4/1972 | Childs | 204/294 |
| 4,349,428 | 9/1982 | Lu | 204/294 |
| 4,385,970 | 5/1983 | Skopp | 204/294 |

Primary Examiner—John F. Niebling
Attorney, Agent, or Firm—Larson and Taylor

[57] ABSTRACT

An electrode for use in electrochemical deionization comprises a current feeder support carrying an intimate mixture of an ion exchange material, and a binder.

The electrode is provided with an inert, electrolyte-permeable outer envelope, adhered to the mixture, for maintaining the mixture in contact with the current feeder during use of the electrode in electrochemical ion exchange. The envelope may be in the form of a non-woven polyamide cloth and may be provided with an outer restrainer, e.g. in the form of a metal or plastics mesh.

8 Claims, 1 Drawing Figure

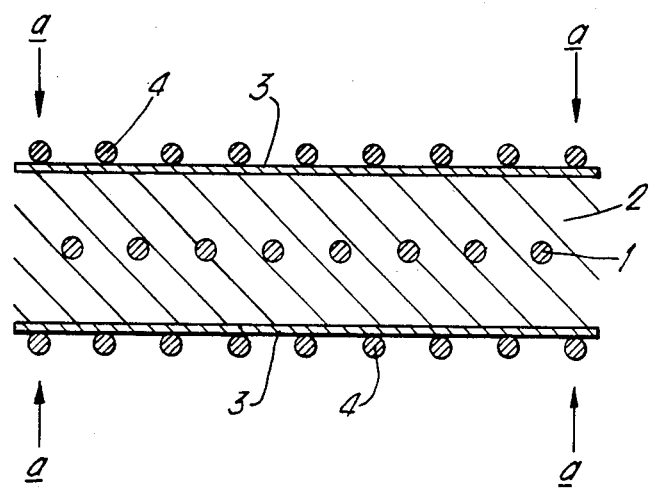

ELECTRODE FOR USE IN ELECTROCHEMICAL DEIONIZATION AND METHOD OF MAKING SAME

This invention relates to electrodes for use in electrochemical deionization.

The electrochemical removal of ions from aqueous solutions, sometimes referred to as electrochemical deionization, is known. See, for example UK Patent Specification No. 1 247 732 and its corresponding U.S. Pat. No. 3,533,929. Basically, it involves establishing an electrochemical cell comprising the aqueous solution as electrolyte, a working electrode and a counter electrode, where at least the working electrode incorporates an ion exchange material such as a resin, and applying a D.C. potential to the working electrode. To remove cations from the solution, a cathode potential is applied to the working electrode, being a cation responsive electrode. A localized change of pH is thereby produced at the electrode due to generation of OH$^-$ ions which in turn produce active sites thereon for adsorption of cations from the aqueous solution. Regeneration of the working electrode is effected by reversal of its polarity which causes the adsorbed cations to be eluted into an aqueous medium. The cell may also be operated in analogous manner, where the working electrode is anion responsive, to remove anions from an aqueous solution or, where the working electrode is cation responsive and the counter electrode anion responsive, to remove both anions and cations therefrom. A particular advantage of electrochemical deionization is that regeneration of the working electrode may be effected without addition of chemical compounds.

The working electrode may comprise a current feeder support carrying an intimate mixture of an ion exchange material, and a binder. The mixture may also include an electrically conducting material. Examples of suitable materials are carbon (e.g. in the form of carbon felt) as the current feeder; an ion exchange resin as the ion exchange material; graphite as the electrically conducting material; and an adhesive elastomer as the binder. A particular problem in the use of such a working electrode in electrochemical deionization is that of maintaining adhesion between the current feeder and the mixture. Thus, it is found in practice that bubbles tend to form therebetween hence reducing the performance of the electrode.

The present invention is concerned with ameliorating the above-mentioned problem. Thus, the invention provides an electrode for use in electrochemical deionization comprising a current feeder support carrying an intimate mixture of an ion exchange material and a binder, the mixture having adhered thereto an inert, electrolyte-permeable outer envelope for maintaining the mixture in contact with the current feeder during use of the electrode in electrochemical deionization.

The outer envelope has to be electrolyte-permeable in order to allow electrolyte to pass therethrough to permit satisfactory contact between an electrolyte and the mixture in use of the electrode in an electrochemical cell. For example, the envelope may be in the form of a cloth having open pores of size of the order of several micrometers (e.g. less than 20 micrometers). By "inert" is meant that the material of the envelope does not react with any of the reagents or other materials which may be present in use of the electrode in an electrochemical cell and, in particular, does not take part in any electrochemical reaction therein. A specific example of a material for the outer envelope is a non-woven polyamide cloth having, for example a maximum pore size of 18 micrometers.

The current feeder may, for example be an amorphous carbon felt or a graphite felt or a metal mesh of, for example stainless steel, platinized titanium, nickel or platinum. Metal current feeders are preferred because of their greater stability during repeated cycling. The ion exchange material may, for example be an ion exchange resin such as known in the art and is preferably, but not essentially, present in finely divided form, for example in a particle size of the order of a hundred micrometers. The binder may, for example, be an adhesive elastomer such as known in the art. The intimate mixture may also include an electrically conducting material such as graphite in finely divided form.

The envelope may be provided with a restrainer for inhibiting distortion of the electrode in use, the restrainer being arranged and adapted to permit access of electrolyte to the envelope in use of the electrode. Thus, the restrainer forces gases produced at the interface of the current feeder and the ion exchange material to be expelled from the electrode at its edges and not cause distortion of the ion exchange material. The restrainer additionally assists the envelope in evening out stresses caused by hydration and expansion and contraction of the ion exchange material.

The restrainer, if provided, may be in the form of a mesh of metal (e.g. expanded metal) or of plastics material where the spaces in the mesh permit access of electrolyte to the envelope in use of the electrode. This may function also as a turbulence promoter thus improving contact of the bulk of the electrolyte with the electrode. If desired, the restrainer (when of metal) may be adapted and arranged to define an electrolyte gap between itself and the envelope, e.g. by being in the form of an unflattened mesh.

This permits the electrode of the invention to be used as a pair of electrodes, the restrainer constituting a counter electrode. The electrolyte gap is therefore dramatically reduced in comparison with an electrochemical cell where a separate counter electrode is used. The cell voltage is thus reduced giving rise to improved electrode performance. This is particularly useful at low electrolyte concentrations where the conductivity of the electrolyte is poor. Clearly, the ion exchange material must not be an electronic conductor in such circumstances, the current being conveyed therethrough by ionic conduction. The restrainer may be held in place by an adhesive such as an epoxy resin adhesive.

The electrode of the invention may be made by contacting the current feeder with an intimate mixture of the ion exchange material and a solution of the binder in a solvent therefor to give a "wet" electrode; applying the envelope thereto so that the binder solution enters (or passes through) the pores of the envelope; and drying to give the final electrode.

Subject to appropriate choice of materials and operating conditions, the electrode of the invention may be used as a working electrode in an electrochemical cell for electrochemical deionization of cations or anions or both, for example in water softening or removal of heavy metal cations.

Several ways of carrying out the invention will now be described below by way of example only.

Reference will be made to the accompanying drawing, the sole FIGURE of which is a schematic sectional diagram showing an electrode of the invention.

Referring to the diagram, a current feeder in the form of a mesh 1 is surrounded by a mixture 2 of an ion exchange material and a binder therefor. The mixture 2 is surrounded by an outer non-woven cloth envelope 3 which is held by a mesh restrainer 4. The directions of restraint applied by the restrainer 4 are indicated by the arrows a.

EXAMPLE 1

A current feeder in the form of carbon felt (sold commercially as RVC 1000) was soaked in toluene. A mixture of a powdered ion exchange resin (particle size 100 micrometers; made from material sold commercially as CG 50), graphite powder, an elastomer (sold commercially as CARIFLEX TR1101) and toluene, in which the elastomer was dissolved, was then applied to the soaked felt (i.e. without allowing the felt to dry) by means of a brush to give a "wet" electrode. A non-woven polyamide cloth (maximum pore size 18 micrometers, thickness 0.3 mm; sold commercially as VILEDON FT 2118) of sufficient size to overlap the wet electrode was immediately applied thereto and the surface of the cloth rubbed to cause the graphite and the elastomer to pass through the pores thereof. The electrode was then dried for 2 hours to give the final electrode, which had a surface area of 175 $cm^2$ and contained 3.5 g of resin, 3.5 g of graphite powder and 2 g of elastomer.

EXAMPLE 2

A current feeder as used in Example 1 was soaked in a mixture of graphite powder, KRATON elastomer and toluene and allowed to dry. Further treatment to give a final electrode was exactly as described in Example 1 after the current feeder had been soaked in toluene.

EXAMPLE 3

An electrode was prepared as described in Example 1. A platinised titanium expanded metal mesh having diamond shaped open portions of approximate 3-4 mm size and metal portions of about 1 mm thickness was applied to the cloth so that it was in touching contact and adhered thereto at its edges by means of an epozy resin adhesive. This gave an electrode as described above with reference to the accompanying drawing.

We claim:

1. An electrode for use in electrochemical deionization comprising a current feeder support carrying an intimate mixture of an ion exchange material and a binder, the mixture having adhered thereto an inert, electrolyte-permeable outer envelope for maintaining the mixture in contact with the current feeder during use of the electrode in electrochemical deionization.

2. An electrode as claimed in claim 1 wherein the envelope is in the form of a cloth having open pores of a size of the order of several micrometers.

3. An electrode as claimed in claim 2 wherein the cloth is a non-woven polyamide cloth.

4. An electrode as claimed in claim 1 wherein the envelope is provided with a restrainer for inhibiting distortion of the electrode in use and/or for promoting turbulence thereby improving contact between the bulk of the electrolyte and the electrode, the restrainer being arranged and adapted to permit access of electrolyte to the envelope in use of the electrode.

5. An electrode as claimed in claim 4 wherein the restrainer is in the form of a mesh of metal or plastics material.

6. An electrode as claimed in claim 5 wherein the restrainer is of metal and is adapted and arranged to define an electrolyte gap between itself and the envelope for permitting the restrainer to be used as a counter electrode in electrochemical deionization.

7. A method of making an electrode for use in electrochemical deionization commprising the steps of
   (i) contacting a current feeder with an intimate mixture comprising an ion exchange material and a solution of a binder in a solvent therefor to give a wet electrode;
   (ii) applying thereto an inert, electrolyte-permeable envelope so that the binder solution enters the pores of the envelope; and
   (iii) drying to give a final electrode wherein the envelope constitutes an outer envelope.

8. A method as claimed in claim 7 comprising the additional step of applying to the outer envelope a restrainer for inhibiting distortion of the electrode in use thereof.

* * * * *